United States Patent Office 3,313,804
Patented Apr. 11, 1967

3,313,804
RIFAMYCIN B DERIVATIVES AND METHOD OF PRODUCING SAME
Piero Sensi and Nicola Maggi, Milan, Italy, assignors to Lepetit S.p.A., Milan, Italy
No Drawing. Filed May 8, 1963, Ser. No. 279,003
Claims priority, application Great Britain, May 25, 1962, 20,255/62
11 Claims. (Cl. 260—239.3)

The present invention is concerned with new antibiotic substances and the process for preparing the same. In our U.S. co-pending application 12,654, filed March 4, 1960, which issued as Patent No. 3,150,046 on Sept. 22, 1964, we described the preparation of the antibiotic rifamycin by fermentation of a strain of *Streptomyces mediterranei* ATCC 13685. As described in the above application, rifamycin is a mixture of highly active antibiotic substances.

Rifamycin B is one of these substances, it has the proposed empirical formula $C_{39}H_{51}NO_{14}$; it is a dibasic acid ($pH_1$ ½=2.8; $pH_2$ ½=6.7) and one of the two acidic functions was found to be a carboxyl group.

One of the particular properties of rifamycin B is its "activation" in aqueous solution i.e. its conversion into another substance possessing a still higher degree of antibacterial activity.

The "activation" product, called by us rifamycin S, has the empirical formula $C_{37}H_{47}NO_{12}$ and by mild reduction can be converted into rifamycin SV ($C_{37}H_{49}NO_{12}$), another new antibiotic of the rifamycin family. Both rifamycin S and rifamycin SV lack the carboxyl group which during the so-called activation is removed in the form of glycolic acid.

New derivatives of rifamycin B have now been prepared wherein the carboxyl group (the removal of which in rifamycins S and SV considerably increases their antibiotic activity) is blocked by conversion into simple, primary and secondary amides.

The process for preparing the amides of rifamycin B consists in reacting rifamycin B with primary and secondary amines or ammonia in the presence of dehydrating agents such as carbodiimides. In most cases dicyclohexylcarbodiimide was used as the condensing agent and tetrahydrofuran was used as the solvent.

The condensation of rifamycin B and the primary and secondary amines in tetrahydrofuran and in the presence of dicyclohexylcarbodiimide occurs also at room temperature; however, under these conditions a period of several hours is necessary for completion of the reaction.

The reaction is therefore preferably carried out by heating rifamycin B with the ammonia or amine at the boiling point of the solvent in a period of time varying between 15 minutes and 2 hours, according to the desired rifamycin-amide.

After concentrating the solvent and on cooling the dicyclohexylurea so obtained (scarcely soluble in tetrahydrofuran) crystallizes out.

The concentrated solution is then generally diluted with water acidified with hydrochloric or sulphuric acid and extracted with a water-insoluble solvent, such as benzene.

The solvent is concentrated to a small volume and by the addition of a solvent miscible with the solvent used for extraction and in which the reaction product is not soluble, such as petroleum ether when benzene was used for extraction, the rifamycinamide precipitates. The amides are then recrystallized, if necessary, from an appropriate solvent.

The amides of rifamycin B are yellow-orange colored substances which generally can be crystallized very easily. They have no well-defined melting points and they decompose with darkening above about 250° C. They are soluble in methanol, ethanol, benzene, acetone, ethyl acetate, very scarcely soluble in water and petroleum ether. They show an acidic function which is not a carboxyl with pH ½ varying between 3.0 and 4.0 and therefore form neutral salts with organic and inorganic bases.

The sodium salt of the amides of rifamycin B are fairly soluble in water at a neutral pH. All the prepared amides show in the U.V. and in the visible region of the spectrum bands similar to those of rifamycin B, with maximum at 220–225 m$\mu$, 304–305 m$\mu$ and 424–430 m$\mu$ in a buffer solution at pH 7.3. The specific absorptions $$(E_{1\,cm.}^{1\%})$$

are lower than those of rifamycin B increasing proportionally with the molecular weight. They show a considerable antibiotic activity against gram-positive bacteria and against *Mycobacterium tuberculosis*.

In the following table the minimal inhibitory concentrations of a number of amides against gram-positive and gram-negative bacteria and *Mycobacterium tuberculosis* are given.

TABLE

| Rifamycin B amide with— | Minimum inhibitory concentrations, γ/ml. | | | | | | | | |
|---|---|---|---|---|---|---|---|---|---|
|  | M. aureus | S. faec. | S. haemol. | B. subtilis | Proteus | E. coli | Klebs. pneumon. | Pseud. aer. | H37RV |
| Ammonia | 1.5 | 9.2 | 0.18 | 12.5 | >200 | >200 | 200 | >200 | 0.009 |
| Monomethylamine | 0.16 | 1 | 6.2 | 0.06 | >200 | 200 | 200 | 200 | 0.15 |
| Monoethylamine | 0.08 | 0.5 | 0.025 | 3.1 | >200 | 150 | 200 | 200 | 0.15 |
| Monoisopropylamine | 0.16 | 1 | 0.06 | 3.1 | 200 | 200 | 200 | 200 | 0.075 |
| Dimethylamine | 0.06 | 0.75 | 0.01 | 1.5 | 100 | 100 | 50 | 100 |  |
|  | (0.04) | (0.3) | (0.037) | (1.5) | (100) | (25) | (25) | (100) | (0.018) |
| Diethylamine | 0.01 | 0.08 | 0.0075 | 0.75 | 6.2 | 25 | 25 | 50 | 0.075 |
| 5-hydroxypentylamine | 0.2 | 1.2 | 0.18 | 3.1 | >200 | >200 | >200 | 200 | 0.1 |
| Pyrrolidine | 0.045 | 0.37 | 0.005 | 1.5 | 50 | 25 | 25 | 50 | 0.01 |
| Piperidine | 0.0075 | 0.1 | 0.005 | 0.75 | 25 | 6.2 | 25 | 25 | 0.005 |
| Morpholine | 0.3 | 1.2 | 0.045 | 1.5 | 200 | 50 | 50 | 200 | 0.1 |
| 1-methylpiperazine | 0.09 | 1.5 | 0.045 | 3.1 | >200 | 50 | 50 | 100 |  |
| Dimethylazetidine | 0.045 | 0.2 | 0.02 | 0.75 | 100 | 50 | 50 | 100 | 0.075 |
| 4-formyl-4-phenylpiperazine | 0.23 | 2.3 | 0.09 | 6.2 | >200 | >200 | >200 | >200 | 0.037 |
| 4,4-dibutyl-pyrazolidine | 0.18 | 1.5 | 0.035 | 6.2 | >200 | >200 | >200 | >200 | 0.01 |
| Aniline | 0.1 | 0.75 | 0.12 | 3.1 | >200 | >200 | >200 | >200 | 0.01 |
| p-Chloroaniline | 0.25 | 0.35 | 0.12 | 2 | >200 | >200 | >200 | >200 | 0.15 |
| p-Bromoaniline | 0.3 | 0.25 | 0.2 | 1.5 | >200 | >200 | >200 | 200 | 0.005 |
| p-Iodoaniline | 0.12 | 0.16 | 0.1 | 1.5 | >200 | >200 | >200 | >200 | 0.15 |
| p-Nitroaniline | 0.3 | 0.4 | 0.1 | 3.1 | >200 | >200 | >200 | >200 | 0.005 |
| m-Carboxyaniline | 0.37 | 12.5 | 0.09 | 6.2 | >200 | >200 | >200 | 200 | 0.15 |
| Hydroxyethylamine | 0.18 | 3 | 0.04 | 12.5 | >200 | >200 | >200 | 200 |  |
| Ephedrine | 0.15 | 1.2 | 0.02 | 1.5 | 200 | 100 | 100 | 200 | 0.02 |
| Phenethoxyamine | 0.04 | 0.4 | 0.01 | 0.5 | 200 | 200 | 200 | 200 | 0.15 |
| 4-formylaminomethyl-4-phenyl-piperidine | 1 | 8.7 | 0.24 | 25 | >200 | 100 | 150 | 200 | 0.04 |

TABLE—Continued

| Rifamycin B amide with— | Minimum inhibitory concentrations, γ/ml. | | | | | | | | |
|---|---|---|---|---|---|---|---|---|---|
| | M. aureus | S. faec. | S. haemol. | B. subtilis | Proteus | E. coli | Klebs. pneumon. | Pseud. aer. | H37RV |
| 4-benzyl-4-hydroxypiperidine | 0.08 | 0.5 | 0.04 | 5 | 200 | 100 | 100 | 200 | 0.15 |
| 6-aminopenicillanic acid | 0.5 | 3 | 0.6 | 6.2 | >200 | >200 | >200 | >200 | 0.6 |
| 3-aminoxypropanol | 0.75 | 5 | 0.37 | 3.1 | >200 | >200 | >200 | >200 | 0.09 |
| 1-carbethoxypiperazine | 0.18 | 1.5 | 0.15 | 1.5 | 200 | 100 | 100 | 200 | 0.09 |
| 2-aminothiazole | 0.75 | 3.1 | 0.55 | 6.2 | >200 | >200 | >200 | 200 | 0.18 |
| Aziridine | 0.18 | 1.5 | 0.18 | 1.5 | >200 | >200 | >200 | 200 | 0.18 |
| Cyclopropylamine | 0.18 | 1.5 | 0.25 | 0.75 | >200 | >200 | >200 | 200 | 0.09 |
| 2-aminoheptane | 0.15 | 0.6 | 1 | 3.1 | >200 | >200 | >200 | 200 | 0.18 |
| ter-Butylamine | 0.15 | 1.2 | 0.3 | 3.1 | 200 | 200 | 200 | 200 | 0.09 |
| Propylamine | 0.25 | 1.2 | 0.3 | 3.1 | >200 | 200 | 200 | 200 | 0.18 |
| 4-aminobenzenelsulfonamide | 0.6 | 3 | 0.3 | 25 | >200 | 200 | 200 | >200 | 0.18 |
| Dibenzylamine | 0.003 | 0.03 | 0.015 | 0.12 | 25 | 12.5 | 25 | 25 | 0.37 |
| Dipropylamine | 0.006 | 0.06 | 0.006 | 0.25 | 12.5 | 6.2 | 25 | 12.5 | 0.18 |
| 1-aminoethanol | 0.075 | 0.6 | 0.045 | 6.2 | >200 | >200 | >200 | 200 | 0.09 |
| Methylpropylamine | 0.01 | 0.04 | 0.006 | 0.18 | 25 | 12.5 | 25 | 50 | 0.18 |
| Ethylpropylamine | 0.0075 | 0.05 | 0.005 | 0.37 | 25 | 6.2 | 25 | 50 | 0.09 |
| N-methylcyclohexylamine | 0.006 | 0.025 | 0.009 | 0.18 | 12.5 | 6.2 | 25 | 25 | 0.09 |
| Diallylamine | 0.005 | 0.05 | 0.003 | 0.18 | 12.5 | 6.2 | 12.5 | 50 | 0.37 |
| Methyl-butylamine | 0.003 | 0.05 | 0.0025 | 0.37 | 12.5 | 6.2 | 25 | 50 | 0.37 |
| N-ethylaniline | 0.003 | 0.04 | 0.006 | 0.37 | 6.2 | 6.2 | 25 | 25 | 0.18 |
| N-methyl-benzylamine | 0.005 | 0.07 | 0.006 | 0.37 | 12.5 | 12.5 | 12.5 | 50 | 0.37 |
| Di-isobutylamine | 0.0012 | 0.012 | 0.006 | 0.045 | 6.2 | 6.2 | 25 | 25 | 0.3 |
| Di-pentylamine | 0.002 | 0.02 | 0.025 | 0.09 | 6.2 | 12.5 | 12.5 | 25 | 0.3 |
| Ethyl-butylamine | 0.0015 | 0.02 | 0.006 | 0.045 | 6.2 | 6.2 | 12.5 | 50 | 0.18 |
| Methyl-propylamine | 0.002 | 0.02 | 0.006 | 0.09 | 6.2 | 6.2 | 12.5 | 50 | 0.18 |
| Methyl-ethylamine | 0.009 | 0.07 | 0.009 | 0.75 | 12.5 | 12.5 | 25 | 50 | 0.37 |
| Methyl-ter-butylamine | 0.0025 | 0.02 | 0.004 | 0.18 | 6.2 | 6.2 | 25 | 50 | 0.37 |
| 2,5-dihydroxymethylpyrrolidine | 0.07 | 1.3 | 0.025 | 3.1 | >100 | >100 | >100 | >100 | 0.18 |
| N¹-cyclohexyl-N¹-cyclohexylaminomethyl-N²-methylpropylenediamine | 0.009 | 0.06 | 0.009 | 0.75 | >100 | >100 | 50 | >100 | 0.15 |
| 2-methylaminoethanol | 0.1 | 1.2 | 0.06 | 5 | >100 | >100 | >100 | >100 | 0.15 |
| 2,6-dimethylpiperidine | 0.003 | 0.02 | 0.005 | 0.18 | 12.5 | 6.2 | 25 | 50 | 0.15 |
| N¹-methylaminoethyl-N¹,N²,N²-triethylethylenediamine | 0.03 | 0.75 | 0.09 | 0.75 | >100 | 25 | >100 | >100 | 0.18 |
| 4-methylaminophenol | 0.09 | 0.55 | 0.09 | 0.18 | >100 | 100 | 100 | >100 | 0.18 |
| 2-ethylaminoethanol | 0.025 | 0.55 | 0.09 | 1.5 | >100 | 100 | 100 | >100 | 0.09 |
| 4-methylpiperidine | 0.005 | 0.045 | 0.01 | 0.37 | 12.5 | 6.2 | 25 | 50 | 0.37 |
| 2-methylpiperidine | 0.005 | 0.03 | 0.01 | 0.18 | 25 | 6.2 | 25 | 50 | 0.18 |
| Dibutylamine | 0.003 | 0.03 | 0.012 | 0.06 | 12.5 | 6.2 | 25 | 50 | 0.02 |
| N¹,N¹,N²-triethylethylenediamine | 0.12 | 0.5 | 0.03 | 3.1 | 200 | 25 | 50 | 50 | 0.075 |
| 2,5-dicarbethoxypyrrolidine | 0.005 | 0.2 | 0.012 | 0.75 | 100 | 50 | 50 | >100 | 0.37 |

A particular interest shows rifamycin B diethylamide (hereinafter named M-14) which proved extremely useful in preventing death in mice experimentally infected with Staphylococcus pyogenes var. aureus. The substance was given once a day for three consecutive days after infection with doses of the pathogenic organism corresponding to 20 and 200 times the $LD_{50}$. The effective subcutaneous dose of M-14 in preventing death was 2.6 and 3.6 mg./kg. respectively, and the oral dose was 22.5 and 30.5 mg./kg. respectively. The $LD_{50}$ of M-14 in mice was 429 mg./kg. intravenously.

M-14 is best administered to humans in the form of ampuls containing 100-250 mg. of active substance. For instance, intramuscular ampuls are prepared from M-14, 250 mg.; ascorbic acid 25 mg.; K metabisulfite 3 mg.; $NaHCO_3$ q.s. to pH 6; polyvinylpyrrolidone K17 300 mg.; distilled water q.s. to 3 ml. Alternatively, other examples of useful compositions are as follows:

250 mg. ampuls:
    M-14 (sodium salt) _____ mg__ 250
    Ascorbic acid _____ mg__ 25
    Disodium EDTA _____ mg__ 1
    Lidocaine HCl _____ mg__ 10
    Na bisulfite _____ mg__ 3
    $NaHCO_3$ q.s. to pH 6
    Na methiolate _____ mg__ 0.06
    Distilled water q.s. to _____ ml__ 3

150 mg. ampuls:
    M-14 (sodium salt) _____ mg__ 150
    Ascorbic acid _____ mg__ 25
    Disodium EDTA _____ mg__ 1
    Na bisulfite _____ mg__ 3
    Na methiolate _____ mg__ 0.06
    $NaHCO_3$ q.s. to pH 6.8
    Distilled water q.s. to _____ ml__ 3

M-14 may be also administered by mouth in the form of tablets, prepared according to well-known procedures, containing 50-500 mg. of active substance.

In any case, the very low toxicity of M-14 allows safe administration to humans in daily oral doses of several grams, without any untoward effect. By parenteral route, doses of 1 g. daily and more can be reached safely for 10 days and longer.

The following non-limitative examples illustrate the invention.

EXAMPLE 1

*Rifamycin B amide.*—Ten grams of rifamycin B are suspended in 500 ml. of anhydrous tetrahydrofuran. Then 2.73 g. of dicyclohexylcarbodiimide are added followed by 35 ml. of tetrahydrofuran previously saturated with $NH_3$. The mixture is refluxed for 20 minutes, then cooled to about 10° C. and allowed to stand for 10-15 minutes. The separation of crystalline lemon-yellowish masses is observed. The solid is filtered and washed with some tetrahydrofuran. The product thus obtained is recrystallized from ethyl acetate.

*Analysis.*—Calcd. for $C_{39}H_{52}N_2O_{13}$: C, 61.89; H, 6.92; N, 3.70. Found: C, 61.88; H, 7.36; N, 3.92.

EXAMPLE 2

*Rifamycin B monoethylamide.*—Two grams of rifamycin B are suspended in 100 ml. of anhydrous tetrahydrofuran. Then 0.550 g. of dicyclohexylcarbodiimide are added followed, after cooling at 5° C. by a solution of ethylamine in tetrahydrofuran. The solution is refluxed for 30 minutes, then it is concentrated to ⅕ of its initial volume and allowed to stand for 3-4 hours at 4° C. The crystalline dicyclohexylurea separates out and is removed by filtration. The filtrate is poured into $H_2O$ acidified with HCl at a temperature of 5-10° C., then extracted with benzene and the benzene solution is concentrated to about one half of its volume. 20–30% of n-hexane is added and the mixture is again concentrated till practically complete crystallization occurs. By crystallization from benzene-n-hexane 1.4 g. of monoethylamide of rifamycin B are obtained.

*Analysis.*—Calcd. for $C_{41}H_{56}N_2O_{13}$: C, 62.72; H, 7.20; N, 3.57. Found: C, 62.38; H, 7.33; N, 3.73.

EXAMPLE 3

*Rifamycin B piperidide.*—Five grams of rifamycin B are suspended in 200 ml. of anhydrous tetrahydrofuran. Then 1.375 g. of dicyclohexylcarbodiimide are added followed by 0.7 ml. of piperidide. The solution is refluxed for 2 hours, then concentrated whereby dicyclohexylurea separates as decribed in Example 2. The filtrate is poured into about 10 times its volume of n-hexane, thus obtaining a precipitate of crude product which is collected and recrystallized from cyclohexane.

*Analysis.*—Calcd. for $C_{44}H_{60}N_2O_{13}$: C, 64.06; H, 7.33; N, 3.40. Found: C, 63.03; H, 7.62; N, 3.68.

EXAMPLE 4

*Rifamycin B pyrrolidide.*—Ten grams of rifamycin B are suspended in 250 ml. of anhydrous tetrahydrofuran. Then 1.1 ml. of pyrrolidine are added followed by 2.75 g. of dicyclohexylcarbodiimide. The mixture is refluxed under stirring for 1.5 hours. The dicyclohexylurea is removed as described in Examples 2 and 3. The filtrate is then poured into water acidified with hydrochloric acid, the solution is repeatedly extracted with carbon tetrachloride, the organic phase is concentrated to small volume and 3–4 volumes of cyclohexane are added. The precipitate is recrystallized from cyclohexane.

*Analysis.*—Calcd. for $C_{43}H_{58}N_2O_{13}$: C, 63.68; H, 7.21; N, 3.45. Found: C, 63.63; H, 7.40; N, 303

EXAMPLE 5

*Rifamycin B anilide.*—Five grams of rifamycin B are suspended in 250 ml. of tetrahydrofuran together with 0.625 ml. of freshly distilled aniline and 1.375 g. of dicyclohexylcarbodiimide. The mixture is refluxed for 1.5 hours under stirring. The product is obtained as described in Example 3 and recrystallized from $CCl_4$.

*Analysis.*—Calcd. for $C_{45}H_{56}N_2O_{13}$: C, 64.89; H, 6.78; N, 3.36. Found: C, 63.79; H, 6.88; N, 3.33.

EXAMPLE 6

The amides of rifamycin B with the following amines were prepared according to the process described in the preceding examples:

| Amine: | Empirical formula |
|---|---|
| Monomethylamine | $C_{40}H_{54}N_2O_{13}$ |
| Monoisopropylamine | $C_{42}H_{58}N_2O_{13}$ |
| Dimethylamine | $C_{41}H_{56}N_2O_{13}$ |
| Diethylamine | $C_{43}H_{60}N_2O_{13}$ |
| 5-hydroxypentylamine | $C_{44}H_{62}N_2O_{14}$ |
| Morpholine | $C_{43}H_{58}N_2O_{14}$ |
| 1-methylpiperazine | $C_{44}H_{61}N_3O_{13}$ |
| Dimethylazetidine | $C_{44}H_{60}N_2O_{13}$ |
| 4-formyl-4-phenylpiperazine | $C_{51}H_{65}N_2O_{14}$ |
| 4,4-dibutyl-pyrazolidine | $C_{50}H_{71}N_3O_{14}$ |
| p-Chloroaniline | $C_{45}H_{55}N_2O_{13}Cl$ |
| p-Bromoaniline | $C_{45}H_{55}N_2O_{13}Br$ |
| p-Iodoaniline | $C_{45}H_{55}N_2O_{13}I$ |
| p-Nitroaniline | $C_{45}H_{55}N_3O_{15}$ |
| m-Carboxyaniline | $C_{46}H_{56}N_2O_{15}$ |
| Hydroxyethylamine | $C_{41}H_{56}N_2O_{14}$ |
| Ephedrine | $C_{49}H_{64}N_2O_{14}$ |
| Phenethoxyamine | $C_{47}H_{60}N_2O_{15}$ |

| Amine: | Empirical formula |
|---|---|
| 4-formylaminomethyl-4-phenilpiperidine | $C_{52}H_{67}N_3O_{14}$ |
| 4-benzyl-4-hydroxypiperidine | $C_{51}H_{66}N_2O_{14}$ |
| 6-aminopenicillanic acid | $C_{47}H_{61}N_3O_{16}S$ |
| 3-aminoxypropanol | $C_{41}H_{56}N_2O_{15}$ |
| 1-carbethoxypiperazine | $C_{46}H_{63}N_3O_{15}$ |
| Aziridine | $C_{42}H_{56}N_2O_{13}$ |
| Cyclopropylamine | $C_{42}H_{56}N_2O_{13}$ |
| 2-aminoheptane | $C_{46}H_{66}N_2O_{14}$ |
| ter-Butylamine | $C_{43}H_{63}N_2O_{13}$ |
| Propylamine | $C_{42}H_{58}N_2O_{13}$ |
| Dibenzylamine | $C_{53}H_{64}N_2O_{13}$ |
| Dipropylamine | $C_{45}H_{64}N_2O_{13}$ |
| 1-aminoethanol | $C_{41}H_{56}N_2O_{14}$ |
| 4-aminobenzenesulphonamide | $C_{45}H_{57}N_3O_{15}S$ |
| Methylpropylamine | $C_{43}H_{60}N_2O_{13}$ |
| Ethylpropylamine | $C_{44}H_{62}N_2O_{13}$ |
| N-methyl-cyclohexylamine | $C_{46}H_{64}N_2O_{13}$ |
| Diallylamine | $C_{45}H_{60}N_2O_{13}$ |
| Methyl-butylamine | $C_{44}H_{62}N_2O_{13}$ |
| N-ethylaniline | $C_{47}H_{60}N_2O_{13}$ |
| N-methylbenzylamine | $C_{47}H_{60}N_2O_{13}$ |
| Di-isobutylamine | $C_{47}H_{68}N_2O_{13}$ |
| Ethyl-butylamine | $C_{45}H_{64}N_2O_{13}$ |
| Methyl-propylamine | $C_{43}H_{60}N_2O_{13}$ |
| Methyl-ethylamine | $C_{45}H_{58}N_2O_{13}$ |
| Methyl-ter-butylamine | $C_{44}H_{66}N_2O_{13}$ |
| 2,5-dihydroxymethylpyrrolidine | $C_{45}H_{64}N_2O_{13}$ |
| $N^1$-cyclohexyl-$N^1$-cyclohexylaminomethyl-$N^2$-Methylpropylenediamine | $C_{56}H_{84}N_4O_{13}$ |
| 2-methylaminoethanol | $C_{45}H_{58}N_2O_{14}$ |
| 2,6-dimethylpiperidine | $C_{46}H_{64}N_2O_{13}$ |
| $N^1$-methylaminoethyl-$N^1,N^2,N^2$-triethylethylenediamine | $C_{50}H_{76}N_4O_{13}$ |
| 4-methylaminophenol | $C_{46}H_{58}N_2O_{14}$ |
| 2-ethylaminoethanol | $C_{43}H_{60}N_2O_{14}$ |
| 4-methylpiperidine | $C_{45}H_{62}N_2O_{13}$ |
| 2-methylpiperidine | $C_{45}H_{62}N_2O_{13}$ |
| $N^1,N^1,N^2$-triethylethylenediamine | $C_{47}H_{69}N_3O_{13}$ |
| Dibutylamine | $C_{47}H_{68}N_2O_{13}$ |
| 2-aminothiazole | $C_{42}H_{53}N_3O_{13}$ |
| Di-n-amylamine | $C_{49}H_{62}N_2O_{13}$ |
| 2,5-dicarbethoxypyrrolidine | $C_{49}H_{66}N_2O_{17}$ |

We claim:
1. A process for preparing an amide of rifamycin B, which comprises heating and reacting rifamycin B with an excess over an equivalent amount of a compound selected from the group consisting of ammonia, and primary and secondary amines, in the presence of dicyclohexylcarbodiimide in tetrahydrofuran.
2. A process as in claim 1, wherein rifamycin B is reacted with ammonia.
3. A process as in claim 1, wherein rifamycin B is reacted with diethylamine.
4. A process as in claim 1, wherein rifamycin B is reacted with ethylamine.
5. A rifamycin B amide selected from the class consisting of rifamycin B amide of ammonia, and primary and secondary amines.
6. Rifamycin B amide.
7. Rifamycin B diethylamide.
8. Rifamycin B ethylamide.
9. Rifamycin B piperidide.
10. Rifamycin B pyrrolidide.
11. Rifamycin B anilide.

No references cited.

SAM ROSEN, *Primary Examiner.*